United States Patent
Shioji

(10) Patent No.: US 8,863,605 B2
(45) Date of Patent: Oct. 21, 2014

(54) GEAR SHIFT LEVER APPARATUS

(75) Inventor: Norihito Shioji, Kosai (JP)

(73) Assignee: Fuji Kiko Co., Ltd., Kosai-shi, Shizuoka-ken (JP)

( * ) Notice: Subject to any disclaimer, the term of this patent is extended or adjusted under 35 U.S.C. 154(b) by 275 days.

(21) Appl. No.: 13/614,542

(22) Filed: Sep. 13, 2012

(65) Prior Publication Data

US 2013/0074633 A1    Mar. 28, 2013

(30) Foreign Application Priority Data

Sep. 22, 2011   (JP) .................................. 2011-207594

(51) Int. Cl.
  *G05G 1/04*   (2006.01)
  *F16H 59/04*   (2006.01)

(52) U.S. Cl.
  CPC ...................................... *F16H 59/04* (2013.01)
  USPC ................. 74/473.33; 74/471 XY; 74/473.18

(58) Field of Classification Search
  USPC ............................. 74/471 XY, 473.18, 473.33
  See application file for complete search history.

(56) References Cited

U.S. PATENT DOCUMENTS

| | | | | |
|---|---|---|---|---|
| 3,465,612 A | * | 9/1969 | Letwin et al. .............. | 74/473.33 |
| 4,138,903 A | * | 2/1979 | Burdette et al. ........... | 74/473.33 |
| 4,583,417 A | * | 4/1986 | Hurlow ...................... | 74/473.15 |
| 4,615,232 A | * | 10/1986 | Puppala ..................... | 74/473.11 |
| 5,287,743 A | * | 2/1994 | Doolittle et al. ......... | 74/471 XY |
| 6,272,944 B1 | * | 8/2001 | Jeong ......................... | 74/473.33 |

FOREIGN PATENT DOCUMENTS

JP    63-186310 A    8/1988

* cited by examiner

*Primary Examiner* — William C Joyce
(74) *Attorney, Agent, or Firm* — Nath, Goldberg & Meyer; Jerald L. Meyer

(57) ABSTRACT

A gear shift lever apparatus includes: a first support shaft pivotally supported on an upper housing; a gear shift lever swingably supported via the first support shaft; an engagement member provided to the gear shift lever; a second support shaft pivotally supported on a lower housing in parallel to the first support shaft with at least part of the second support shaft overlapping the first support shaft in an axial direction thereof; a selector lever swingably supported via the second support shaft; an engagement receiver formed in the selector lever and being engageable with the engagement member in a swing direction thereof; and a bypass unit configured to prevent the selector lever from interfering with the first support shaft upon swinging of the gear shift lever due to a manipulation of the gear shift lever through engagement between the engagement member and the engagement receiver.

3 Claims, 5 Drawing Sheets

GEAR SHIFT LEVER APPARATUS

CROSS REFERENCE TO RELATED APPLICATION

This application is based upon and claims the benefit of priority from the prior Japanese Patent Application No. 2011-207594, filed on Sep. 22, 2011, the entire contents of which are incorporated herein by reference.

BACKGROUND

1. Technical Field

The disclosure relates to a gear shift lever apparatus which includes a gearshift lever configured to change the gear shift position by manipulating the gear shift lever swingingly.

2. Related Art

In a general practice, a gear shift lever apparatus is disposed in a center console between the driver seat and the front passenger seat. Since the center console is situated within the reach of the hand of the driver during driving, various layouts are demanded for the center console to improve the comfort in the vehicle interior. To satisfy such a demand, Japanese Patent Application Publication No. Sho 63-186310 has proposed a gear shift lever apparatus in which the position of the gear shift lever can be disposed offset in a vehicle widthwise direction while the attachment position of the selector lever is unchanged.

A gear shift lever apparatus 101 shown in FIG. 1, which has been disclosed in Japanese Patent Application Publication No. Sho 63-186310, includes: a support shaft 102 disposed extending in the vehicle widthwise direction; a gear shift lever 103 swingably pivotally supported by the support shaft 102; and a selector lever 104 pivotally supported by the support shaft 102 together with the gear shift lever 103. In the gear shift lever apparatus 101, swinging manipulation of the gear shift lever 103 in the vehicle front-rear direction makes the selector lever 104 swing and thereby change the range position of the automatic transmission (not illustrated) through a wire (not illustrated) connected to the lower end of the selector lever 104. In the gear shift lever apparatus 101, the gear shift lever 103 and the selector lever 104 are supported by the support shaft 102 with the gear shift lever 103 offset to one end of the support shaft 102 and the selector lever 104 offset to the other end of the support shaft 102.

Since, as described above, the gear shift lever 103 and the selector lever 104 are supported by the support shaft 102 with the gear shift lever 103 offset to one end of the support shaft 102 and the selector lever 104 offset to the other end of the support shaft 102, the gear shift lever 103 can be disposed offset in the vehicle widthwise direction while the attachment position of the selector lever 104 is unchanged.

SUMMARY

In the configuration disclosed in the Japanese Patent Application Publication No. Sho 63-186310, however, the gear shift lever 103 and the selector lever 104 are supported by the same shaft, the support shaft 102 has to be made long according to the dimension of their offset positioning, and the gear shift lever apparatus as a whole is inevitably large in size in the vehicle widthwise direction. This is likely to affect the layout of the center console, although the position of the gear shift lever 103 can be offset from the selector lever 104.

An object of disclosed embodiments is to provide a gear shift lever apparatus which enables the gear shift lever to be disposed offset from the selector lever without affecting the layout of the center console.

An embodiment is a gear shift lever apparatus including: a housing including an upper housing and a lower housing; a first support shaft pivotally supported on the upper housing; a gear shift lever swingably supported via the first support shaft; an engagement member provided to a lateral side of the gear shift lever and protruding in a direction orthogonal to a plane on which the gear shift lever swings; a second support shaft pivotally supported on the lower housing in parallel to the first support shaft with at least part of the second support shaft overlapping the first support shaft in an axial direction thereof; a selector lever swingably supported via the second support shaft; an engagement receiver formed in a lateral side of the selector lever, extending in a direction orthogonal to a plane on which the selector lever swings, and being engageable with the engagement member in a swing direction thereof; and a bypass unit configured to prevent the selector lever from interfering with the first support shaft upon swinging of the gear shift lever due to a manipulation of the gear shift lever through engagement between the engagement member and the engagement receiver.

In the foregoing configuration, the second support shaft is disposed in parallel to the first support shaft in the way that makes the part of the second support shaft overlap the first support shaft in its axial direction. For this reason, the lower housing is not disposed on the line extending from the first support shaft of the upper housing. Thereby, the dimension of the upper housing in the axial direction of the first support shaft can be made shorter. This makes it possible to dispose the gear shift lever offset from the selector lever without affecting the layout of the center console.

In addition, because the overall length dimension from the second support shaft to the selector lever can be made smaller, the twist of the selector lever is eliminated. This makes it possible to improve the rigidity of the selector lever, and additionally to prevent the occurrence of vibration.

Furthermore, because the selector lever is disposed bypassing the upper shift shaft, the selector lever can be disposed as close to the gear shift lever as possible. Thus, the selector lever can be housed in the housing, and thereby, the dimension of the upper housing in the axial direction of the first support shaft can be made smaller. This makes it possible to make the apparatus as a whole smaller.

The upper housing may be disposed on an upper surface side of a vehicle body-side fixing portion; and the lower housing may be disposed on an undersurface side of the vehicle body-side fixing portion.

In the foregoing configuration, the upper housing is disposed on the upper surface side of the vehicle body-side fixing portion, and the lower housing is disposed on the undersurface side of the vehicle body-side fixing portion. For this reason, the space which the gear shift lever apparatus occupies in the center console can be made smaller. This makes it possible to increase the degree of freedom of the layout of the center console.

The bypass unit may include: a small-diameter portion provided to an end of the first support shaft and having a shaft diameter smaller than the rest of the first support shaft; and an arc-shaped elongated hole formed in the selector lever for the small-diameter portion penetrated therein to allow the selector lever to swing.

In the foregoing configuration, since the small-diameter portion is provided to the first support shaft, the elongated hole formed in the selector lever can be made as small as possible. This enables the selector lever to bypass the first support shaft without reducing the rigidity of the selector lever, and with the simple structure.

Moreover, because the selector lever is disposed bypassing the first support shaft, the selector lever can be housed in the housing, and the apparatus as a whole can be made smaller.

DETAILED DESCRIPTION

Figure 1:
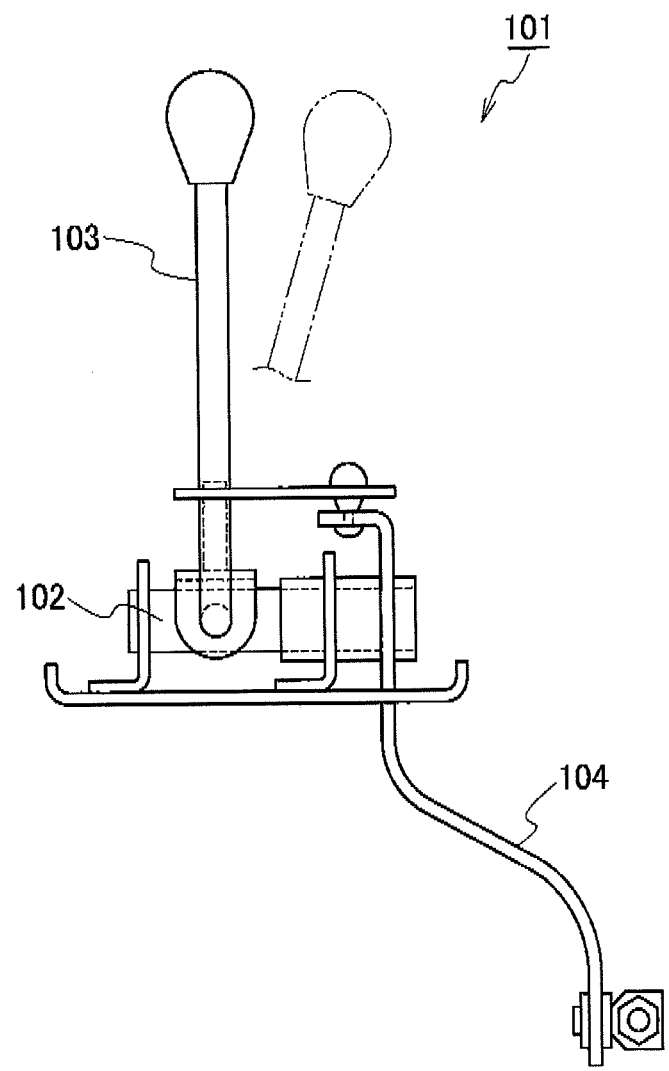
FIG. 1 is a side view showing a related gear shift lever apparatus.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Descriptions will be hereinbelow provided for the embodiments of the present invention by referring to the drawings.

Figure 2:
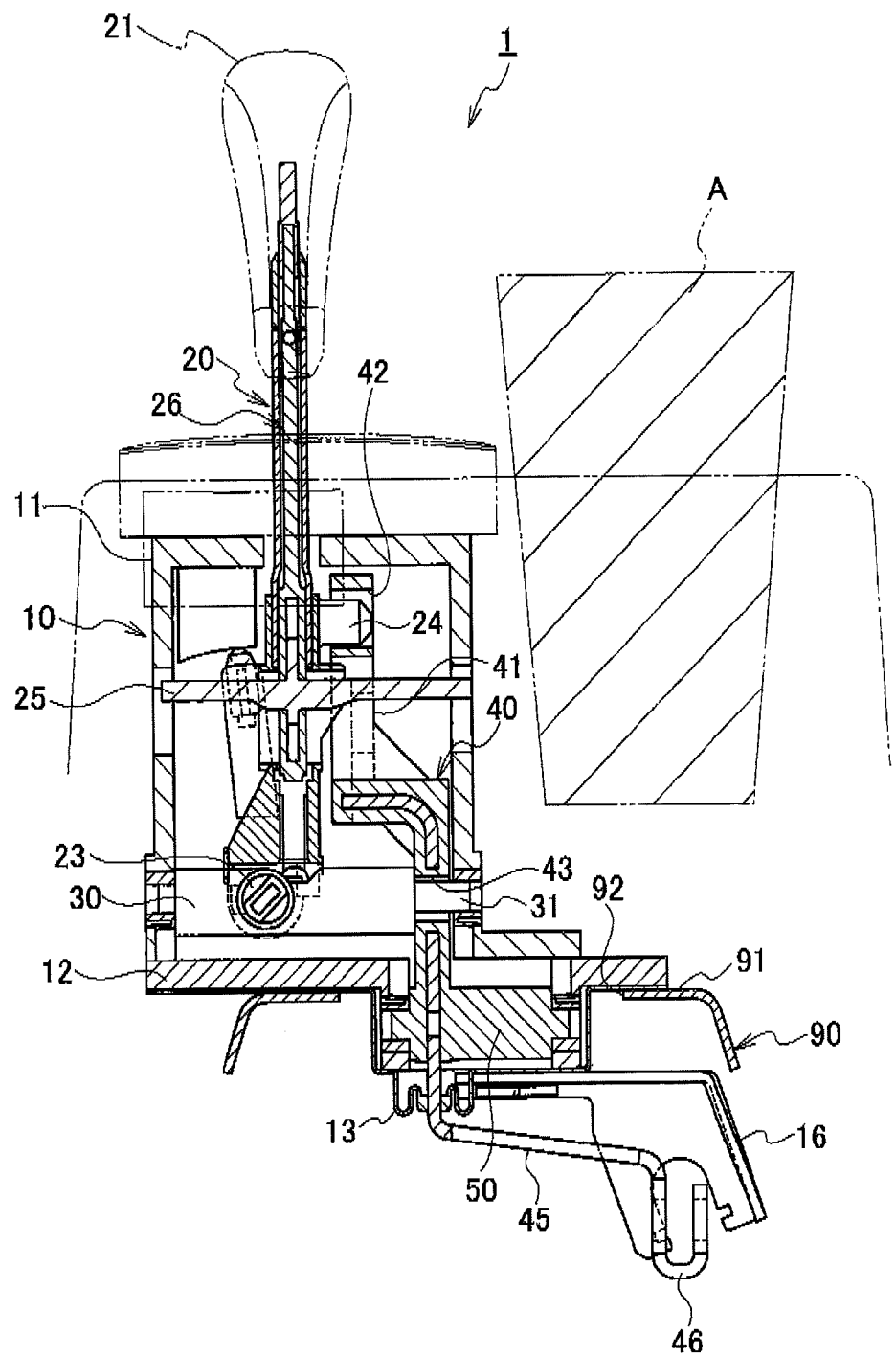
FIG. 2 is a cross-sectional view of a gear shift lever apparatus of a first embodiment of the present invention taken in the selection direction, and shows the gear shift lever apparatus as being in an automatic transmission (A/T) mode.
Figure 3:
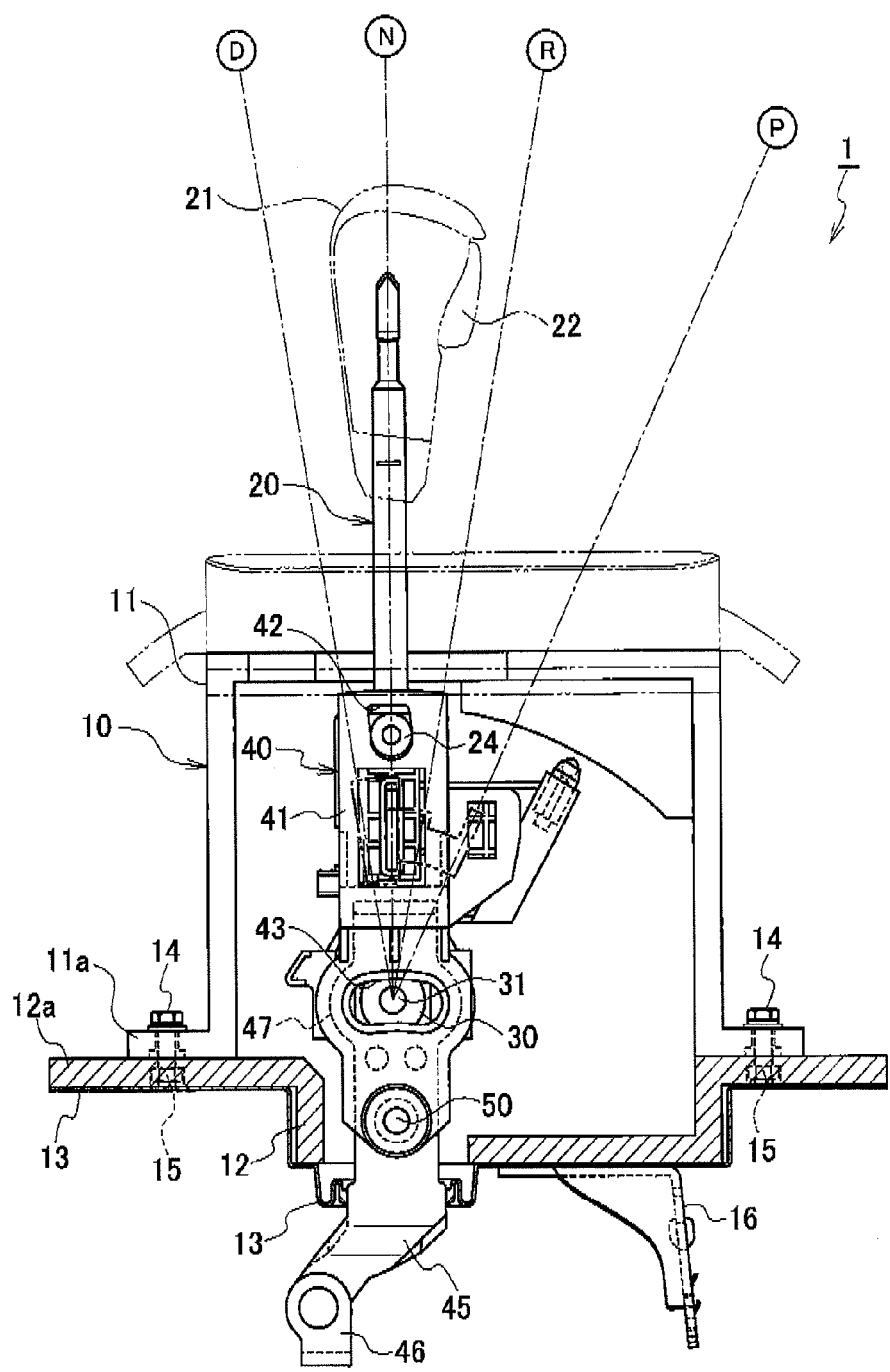
FIG. 3 is another cross-sectional view of the gear shift lever apparatus of the first embodiment of the first embodiment of the present invention taken in the shift direction.
Figure 4:
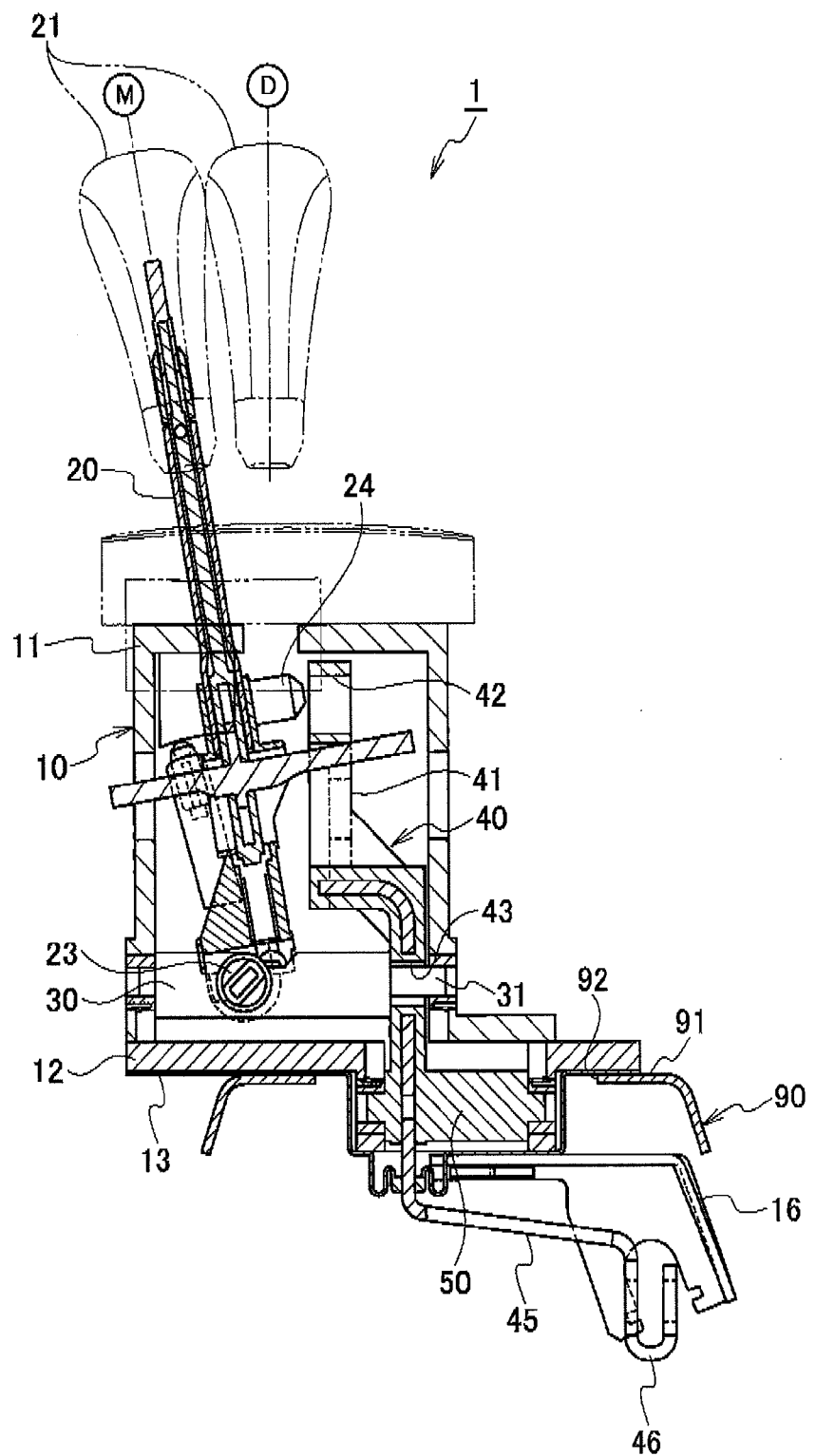
FIG. 4 is the other cross-sectional view of the gear shift lever apparatus of the first embodiment of the present invention taken in the selection direction, and shows the gear shift lever apparatus as being in a manual transmission (M/T) mode.

As shown in FIGS. 2 to 4, a gear shift lever apparatus 1 of a first embodiment of the present invention is disposed on a vehicle body-side fixing portion 91 of a floor panel 90 which is situated between the driver seat and the front passenger seat of the vehicle. The gearshift lever apparatus 1 is provided to switch multiple ranges set for an automatic transmission (not illustrated), and changes the automatic transmission to a desired one of the multiple ranges. From the front to rear in a shift direction (in the vehicle front-rear direction), a parking (P) range, a reverse (R) range, a neutral (N) range and a drive (D) range are set for the automatic transmission in this order. In addition, an automatic transmission (A/T) mode and a manual transmission (M/T) mode are set in the D range. The A/T mode and the M/T mode are disposed in the selection direction (the vehicle widthwise direction) orthogonal to the shift direction. Incidentally, shift-up (+) manipulation and shift-down (−) manipulation in the shift direction are designed to be capable of being performed while the gear shift lever is in the M mode.

The gear shift lever apparatus 1 includes, among other things, a housing 10, a gear shift lever 20, an upper shift shaft (first support shaft) 30, a selector lever 40, and a lower shift shaft (second support shaft) 50.

The housing 10 includes an upper housing 11, a lower housing 12 and a lower cover 13. The upper housing 11 and the lower housing 12 form the housing 10 which is shaped like a box. The lower cover 13 is disposed on the undersurface of the lower housing 12. The upper housing 11 and the lower housing 12 are integrally assembled together by screwing a fixing bolt 14, which penetrates the flanges 11a, 12a provided to the respective upper and lower housings 11, 12, to a fixing nut 15.

The gear shift lever 20 is supported on the upper housing 11 with the base end portion of the gear shift lever 20 pivotally attached to the upper shift shaft 30, and thereby is swingable in the shift direction. A shift knob 21 is disposed in the distal end portion of the gear shift lever 20, and a shift button 22 is disposed in the shift knob 21. Pressing manipulation on the shift button 22 makes a rod 26 and a position pin 25 move downwards, and disengages the position pin 25 from a dent groove (not illustrated) provided to the upper housing 11. This makes it possible for the gear shift lever 20 to swing in the shift direction. In addition, the upper shift shaft 30 is provided with a selector shaft 23 which extends in the shift direction, and the selector shaft 23 makes it possible for the gear shift lever 20 to swing in the selection direction.

A column-shaped engagement protrusion (engagement member) 24 is provided to a lateral side of the gear shift lever 20. The engagement protrusion 24 projects orthogonal to a plane on which the gear shift lever 20 swings in the shift direction.

The upper shift shaft 30 is disposed in the selection direction, and the two ends of the upper shift shaft 30 are pivotally supported on the respective inner surfaces of the upper housing 11. In addition, a small-diameter portion 31 is provided to one end of the upper shift shaft 30. The shaft diameter of this small-diameter portion 31 is set smaller than that of the other end of the upper shift shaft 30.

The selector lever 40 includes an upper lever 41 and a lower lever 45. The lower shift shaft 50 penetrates a joint portion where the upper lever 41 and the lower lever 45 are joined together. The selector lever 40 is supported on the lower housing 12 by being pivotally attached to the lower shift shaft 50 and thereby is swingable in the shift direction.

The upper lever 41 is disposed upwards from the lower shift shaft 50 along the gear shift lever 20. An engagement hole (engagement receiver) 42 is opened in an upper-end lateral side of the upper lever 41, and penetrates the upper lever 41 in a direction orthogonal to the plane on which the selector lever 40 swings. The engagement hole 42 is formed to enable the engagement protrusion 24 to be detachably inserted thereinto, and to be capable of engaging with the engagement protrusion 24 when the gear shift lever 20 swings in the shift direction. When the gear shift lever 20 moves to the A/T mode, the engagement protrusion 24 is inserted and engaged with the engagement hole 42. When the gear shift lever 20 moves to the M/T mode, the engagement protrusion 24 comes out of the engagement hole 42, and their engagement is undone. As a structure serving as a bypass unit for preventing the selector lever 40 from interfering with the upper shift shaft 30, the lower end portion of the upper lever 41 is progressively larger in width in the shift direction while in the shape of a spindle. An arc-shaped elongated hole 43 is formed in this spindle-shaped portion 47, and the small-diameter portion 31 of the upper shift shaft 30 is inserted into the arc-shaped elongated hole 43. To put it specifically, the selector lever 40 is disposed to bypass the upper shift shaft 30 by means of the elongated hole 43; and when the selector lever 40 swings in the shift direction, the small-diameter portion 31 moves inside the elongated hole 43 in order that the selector lever 40 should not interfere with the smaller-diameter portion 31.

The lower lever 45 is extended downward from the lower shift shaft 50, and a wire connector 46 is provided to the lower end of the lower lever 45. A transmission cable (not illustrated), which is extended from the automatic transmission (not illustrated) disposed under the floor panel 90 of the vehicle, is formed from: a cable outer (not illustrated) made from a flexible tube-shaped member; and an inner wire (not illustrated) inserted in the cable outer. The end portion of the cable outer (not illustrated) is fixed to a cable bracket 16, and the end portion of the inner wire (not illustrated) is connected to the wire connecter 46.

The lower shift shaft 50 is disposed in parallel to the upper shift shaft 30 in the selection direction, and vertically under the upper shift shaft 30. The two ends of the lower shift shaft 50 are supported by the inner walls of the lower housing 12. In addition, the lower shift shaft 50 is disposed in away that a part of the lower shift shaft 50, which penetrates the selector lever 40, overlaps the small-diameter portion 31 of the upper shift shaft 30 in its axial direction when looked down from above vertically.

A mounting hole 92 configured to make the inside and outside of the vehicle communicate with each other is formed in the vehicle body-side fixing portion 91. The gear shift lever apparatus 1 is mounted on the vehicle body-side fixing portion 91 from above in the vehicle interior while the lower housing 12 is put in a state of projecting through the mounting hole 92 toward the outside of the vehicle, that is to say, projecting downward beyond the floor panel 90.

In the foregoing constitution, the lower shift shaft 50 is disposed in parallel to the upper shift shaft 30 and vertically under the upper shift shaft 30, and with the part of the lower shift shaft 50 overlapping the upper shift shaft 30 in its axial direction. Thereby, the lower housing 12 does not have to be disposed on the line extending from the upper shift shaft 30 of the upper housing 11. For this reason, the dimension of the upper housing 11 in the selection direction can be set shorter. This makes it possible to dispose the gear shift lever 20 offset from the automatic transmission without affecting the layout of the center console.

In addition, the lower shift shaft 50 is disposed under the floor panel 90. For this reason, the overall length dimension from the lower shift shaft 50 to the wire connector 46 of the lower lever 45 is made shorter. This makes it possible to inhibit the twist of the selector lever 40, to improve the rigidity of the selector lever 40, and additionally to inhibit the occurrence of vibration.

Furthermore, the upper housing 11 is disposed on the upper surface side of the vehicle body-side fixing portion 91, and the lower housing 12 is disposed on the undersurface side of the vehicle body-side fixing portion 91. For this reason, even if a space A as shown in FIG. 2 needs to be set up, the space which the gear shift lever apparatus 1 occupies in the center console can be made small. This makes it possible to increase the degree of freedom of the layout of the center console.

Moreover, because the small-diameter portion 31 is provided to the upper shift shaft 30, the elongated hole 43 formed in the upper lever 41 of the selector lever 40 can be made as small as possible. This enables the selector lever 40 to bypass the upper shift shaft 30 without reducing the rigidity of the selector lever, and with the simple structure.

Besides, because the selector lever 40 is disposed bypassing the upper shift shaft 30, the selector lever 40 can be disposed as close to the gear shift lever 20 as possible. For this reason, the selector lever 40 can be housed in the housing 10, and the dimension of the upper housing 11 in the axial direction of the upper shift shaft 30 can be made accordingly smaller. This makes it possible to make the apparatus as a whole smaller.

The gear shift lever apparatus 1 of this embodiment includes the M/T mode, and is designed in the way that: while in the A/T mode, the gear shift lever 20 and the selector lever 40 are linked together; and while in the manual transmission mode, the gear shift lever 20 and the selector lever 40 are not linked together. However, it should be noted that even if the gear shift lever apparatus adopts a configuration in which the gear shift lever is manipulated zigzaggedly both in the shift direction and in the selection direction as in a case of a gate-type gear shift lever apparatus, this embodiment is applicable by making changes to the shape of the engagement protrusion for the purpose of making the engagement protrusion and the engagement hole engage with each other, as well, when the gear shift lever is swung in the selection direction.

In addition, in this embodiment, the engagement member is the engagement protrusion, and the engagement receiver is the engagement hole. However, the combination of the engagement member and the engagement receiver is not necessarily limited to this combination of the engagement protrusion and the engagement hole. This embodiment is applicable to any other configuration, as long as the configuration enables the linkage in the shift direction as well as the engagement and disengagement in the selection direction. For example, this embodiment is applicable to a configuration in which: the engagement member is the engagement hole; and the engagement receiver is the engagement protrusion.

Figure 5:
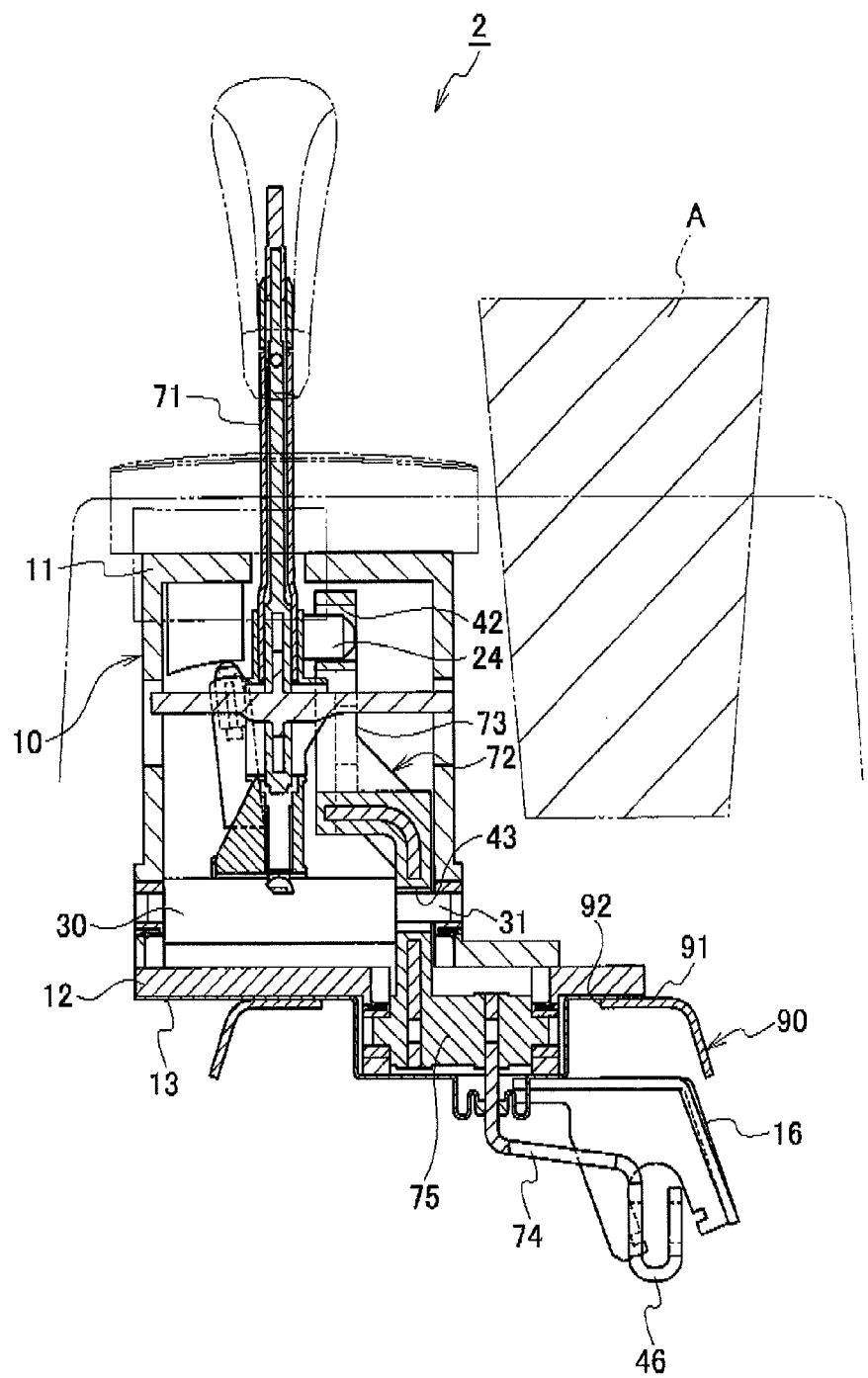
FIG. 5 is a cross-sectional view of a gear shift lever apparatus of a second embodiment of the present invention taken in the selection direction.

Next, descriptions will be provided for a gear shift lever apparatus 2 of a second embodiment of the present invention by referring to the drawings. Components which are common between the gear shift lever apparatus 1 of the first embodiment and the gear shift lever apparatus 2 of the second embodiment will be denoted by the same reference numerals, and descriptions for the common components will be omitted. What makes the second embodiment, which is shown in FIG. 5, differ from the first embodiment to a large extent is that a gear shift lever 71 and a selector lever 72 are different in configuration from the gear shift lever 20 and the selector lever 40.

The gear shift lever 71 of this embodiment includes no selector shaft 23, and is directly supported by the upper shift shaft 30. For this reason, the gear shift lever 71 swings only in the shift direction, but not in the selection direction. In other words, the engagement protrusion 24 and the engagement hole 42 always engage with each other in the shift direction without disengaging from each other.

In addition, in the selector lever 72 of this embodiment, an upper lever 73 and a lower lever 74 are spaced out in the axial direction of a lower shift shaft 75.

The foregoing constitution brings about the same working/effects as the first embodiment. In addition, because the upper lever 73 and the lower lever 74 of the selector lever 72 are spaced out in the axial direction of the lower shift shaft 75, it is possible to inhibit the twist of the selector lever 72 further, to increase the rigidity of the selector lever 40 further, and additionally to inhibit the occurrence of vibration.

Although the present invention has been described based on the embodiments, it is to be noted that the present invention is not limited only to these embodiments and various other embodiments may also be applicable.

What is claimed is:
1. A gear shift lever apparatus comprising:
a housing comprising an upper housing and a lower housing;
a first support shaft pivotally supported on the upper housing;
a gear shift lever swingably supported via the first support shaft;
an engagement member provided to a lateral side of the gear shift lever and protruding in a direction orthogonal to a plane on which the gear shift lever swings;
a second support shaft pivotally supported on the lower housing in parallel to the first support shaft with at least part of the second support shaft overlapping the first support shaft in an axial direction thereof;

a selector lever swingably supported via the second support shaft;

an engagement receiver formed in a lateral side of the selector lever, extending in a direction orthogonal to a plane on which the selector lever swings, and being engageable with the engagement member in a swing direction thereof; and the selector lever overlapping the first support shaft in the axial direction and configured to prevent the selector lever from interfering with the first support shaft upon swinging of the gear shift lever due to a manipulation of the gear shift lever through engagement between the engagement member and the engagement receiver.

2. The gear shift lever apparatus of claim 1, wherein the upper housing is disposed on an upper surface side of a vehicle body-side fixing portion; and the lower housing is disposed on an undersurface side of the vehicle body-side fixing portion.

3. The gear shift lever apparatus of claim 1, wherein the first support shaft comprises:

a small-diameter portion provided to an end of the first support shaft and having a shaft diameter smaller than the rest of the first support shaft, and the selector lever comprises an arc-shaped elongated hole formed in the selector lever for the small-diameter portion penetrated therein to allow the selector lever to swing.

* * * * *